United States Patent [19]
Chen

[11] Patent Number: 5,533,630
[45] Date of Patent: Jul. 9, 1996

[54] COMPACT DISK ASSEMBLY RACK

[76] Inventor: Hui-Huang Chen, No. 105-1, Chang Shui Road, Kun Lun Village, Pu Yen County, Changhua, Taiwan

[21] Appl. No.: 404,611

[22] Filed: Mar. 15, 1995

[51] Int. Cl.⁶ .................................................. A47F 7/00
[52] U.S. Cl. ................. 211/40; 211/42; 211/50; 312/9.9
[58] Field of Search ................... 211/40, 41, 42, 211/43, 50, 51; 312/9.9

[56] References Cited

U.S. PATENT DOCUMENTS

| | | | |
|---|---|---|---|
| 3,347,393 | 10/1967 | Frey | 211/40 |
| 4,318,749 | 3/1982 | Mayer | 211/41 X |
| 4,657,146 | 4/1987 | Walters | 211/40 X |
| 4,966,278 | 10/1990 | Rosi et al. | 211/40 X |
| 4,966,549 | 10/1990 | Ohdate | 211/41 X |
| 5,035,332 | 7/1991 | Stravitz | 211/40 |
| 5,117,984 | 6/1992 | Kennedy | 211/40 X |
| 5,415,297 | 5/1995 | Klein et al. | 211/194 X |
| 5,437,376 | 8/1995 | Larsen | 211/40 |

*Primary Examiner*—Robert W. Gibson, Jr.
*Attorney, Agent, or Firm*—Beveridge, DeGrandi Weilacher & Young

[57] ABSTRACT

A compact disk assembly rack structure includes two elongated strips, a lower frame, two rods, two support frames and an upper frame as well as a multiplicity of screws. Each of the strips have an upper groove for receiving a longer side of the lower frame which is squeezed through a gap into a circular portion below to be positioned therein. A rod is then fitted into the upper groove of the strip. The support frames each have a clamp for fastening onto a corresponding narrow portion of a shorter side of the lower frame. The upper frame has flat surfaces formed at two shorter sides thereof corresponding to flat surfaces formed at the top of the support frames. Each of the shorter sides of the upper frame is fastened to each of the support frames by screws passing through the flat surfaces of the upper frame into the flat surfaces of the support frames. A number of compact disk racks may be placed one on top of the other for storage or transportation. The compact disk assembly rack may be partly assembled so that the support frames may be folded inwardly to rest in the hollow space of the lower frame, while the upper frame is placed horizontally around the lower frame, achieving the purposes of saving space in storage and transportation.

1 Claim, 5 Drawing Sheets

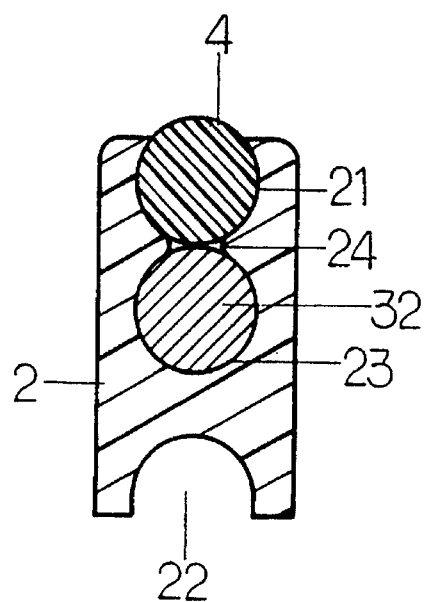
FIG. 1-A
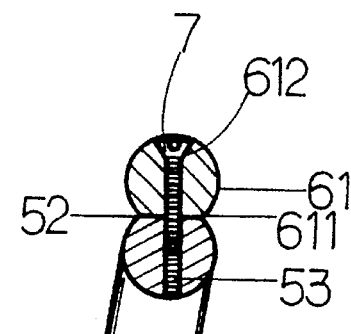
FIG. 1-B

COMPACT DISK ASSEMBLY RACK

BACKGROUND OF THE INVENTION

The present invention relates to a compact disk assembly rack which is aesthetically pleasing in appearance as well as secure and space-saving.

Compact disk racks or containers are necessary accessories for music lovers. Previously, there were boxes or racks available for keeping compact disks, but the disks could not be arranged tidily or securely. Removal of the disks from the boxes was also inconvenient, and no classification was provided. Later, there was another kind of container for storing compact disks. It consists of step-like level rack integrally bent from a metal sheet and contained within an injection molded plastic box or a wooden box. However, there are the following drawbacks in this design.

1. Because the rack structure is long and large and has to be formed by integral molding, experienced workers or advanced molding techniques are required in production.

2. In using integral molding in production, the structure of the compact disk container is fixed, lacking varieties. Besides, such containers occupy space, and hence transportation and storage costs are high.

SUMMARY OF THE INVENTION

It is therefore the primary object of the present invention to provide a compact disk assembly rack structure, comprising two elongated strips, a lower frame, two rods, two support frames and an upper frame as well as a multiplicity of screws. Each of the strips has an upper groove for receiving a longer side of the lower frame which is squeezed through a gap into a circular portion below and positioned in place. One of the rods is then inserted into the upper groove of the strip. Each of the support frames has a clamp for fastening onto a corresponding narrow portion of a shorter side of the lower frame. Each of the shorter sides of the upper frame is provided with a flat surface corresponding to a flat surface formed at the top of each support frame. The upper frame and the support frames are fastened together by means of screws passing through the respective flat surfaces of the upper frame and the support frames. The lower frame is smaller than the upper frame so that a number of the compact disk assembly racks according to the present invention may be placed one on top of the other during transportation to save space and costs. The compact disk assembly rack according to the present invention may also be partly assembled, without fastening the upper frame to the corresponding support frames, so that the support frames may be folded inwardly to lie in the hollow space of the lower frame, while the upper frame is placed around the smaller frame, hence saving space and transportation costs.

Another object of the present invention is to provide a compact disk assembly rack structure, in which rods fitted into the upper grooves of the elongated strips may be of any desired color to enhance the ornamental effect of the rack.

Still another object of the present invention is to provide a compact disk assembly rack structure, in which a horizontal bar may be provided across the central hollow space of each support frame for sticking thereon classification labels.

BRIEF DESCRIPTION OF THE DRAWINGS

The foregoing and other features and advantages of the present invention will be more clearly understood from the following detailed description and the accompanying drawings, in which.

FIG. 1A is a sectional view of the elongated strips of the present invention in an assembled state;

FIG. 1B is a sectional view of the support frames of the present invention;

DETAILED DESCRIPTION OF THE PREFERRED EMBODIMENT

Figure 1:
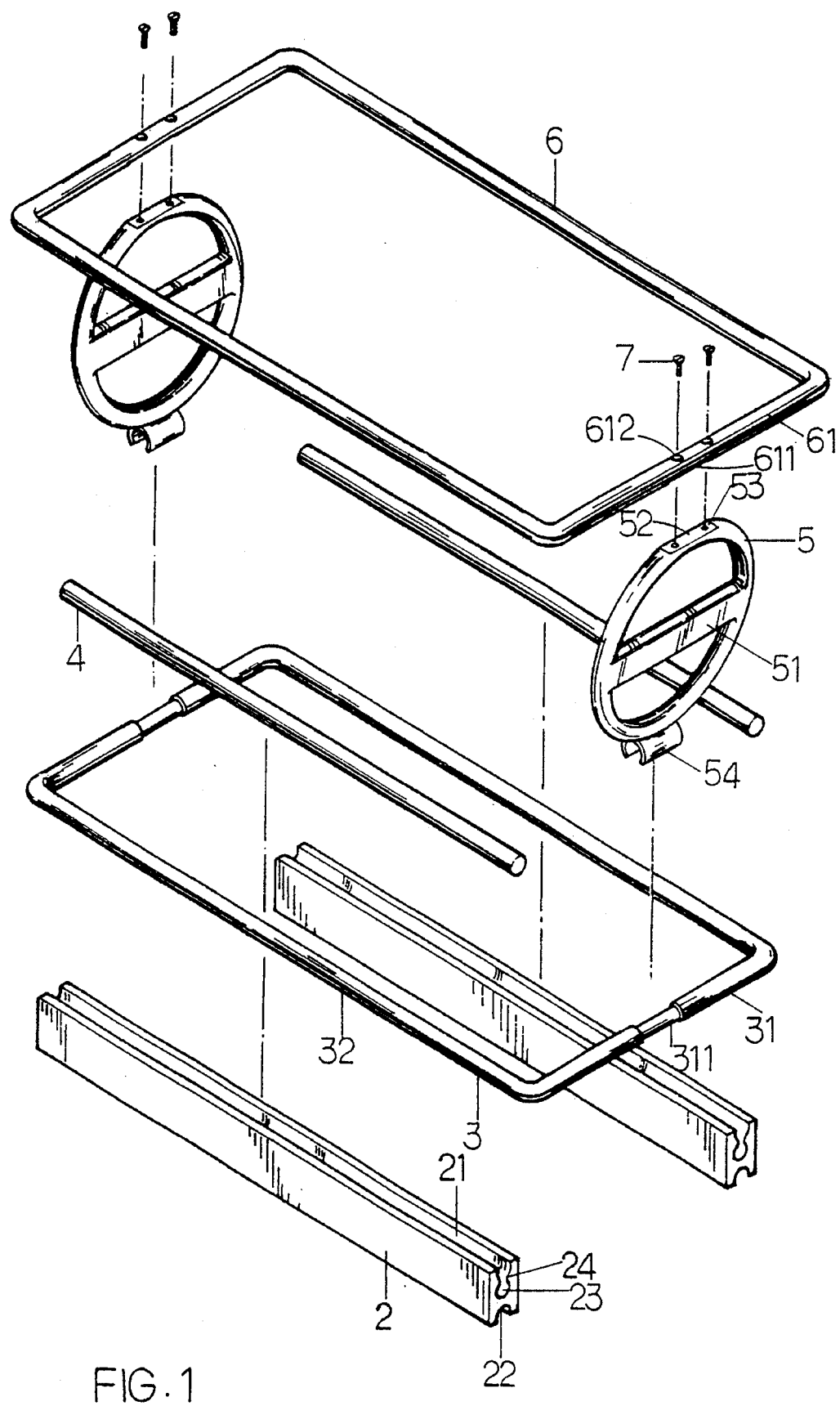
FIG. 1 is a perspective exploded view of the present invention.
Figure 2:
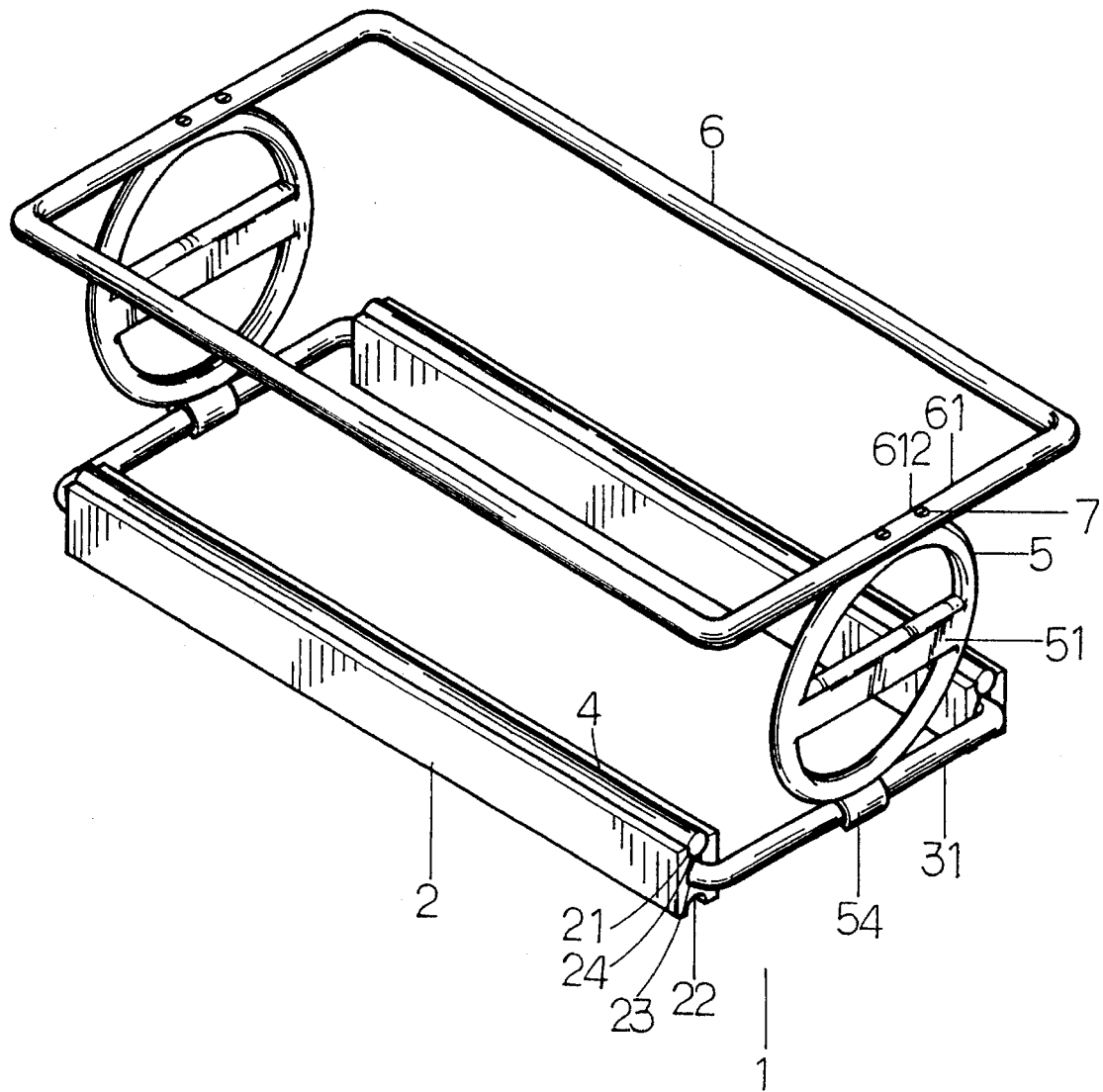
FIG. 2 is a perspective view of the present invention in an assembled state.

With reference to FIGS. 1 and 2, the compact disk assembly rack 1 according to the present invention mainly comprises two elongated strips 2, a lower frame 3, two rods 4, two support frames 5, and an upper frame 6 as well as a plurality of screws 7.

The two elongated strips 2 are integrally pressed from a suitable elastic material. Each strip 2 is configured to have an upper groove 21 and a lower groove 22 of a suitable depth formed longitudinally in its upper and lower surfaces. At the lower part of the upper groove 21 is a circular portion 23 with a narrow gap 24 formed therebetween. The lower frame 3 is a rectangular structure bent from a circular rod, with two narrow portions 311 formed at suitable positions of its two shorter sides 31. The two rods 4 are formed of plastic materials. The two support frames 5 are generally annular in shape with a horizontal bar 51 formed across the hollow portion thereof. Classification stickers or labels may be stuck onto the bar 51. The top side of each support frame 5 is configured to be a flat surface 52 having a plurality of screw holes 53. A clamp 54 in the shape of a "C" is formed at the bottom side of the support frame 5. The upper frame 6 is also rectangular in shape and bent from a circular rod, and which is larger than the lower frame 3. The two shorter sides 61 of the upper frame 6 each have a flat surface 611 formed at the bottom thereof at a suitable position. A plurality of screw holes 612 are formed in the shorter sides of the upper frame 6 opposite to the flat surfaces 611.

Each of the longer sides 32 of the lower frame 3 may be fitted into the corresponding upper groove 21 of each strip 2 and squeezed past the gap 24 into the circular portion 23 to be tightly positioned therein. The two rods 4 are then respectively inserted into the corresponding upper grooves 21 of the strips 2 for ornamental purposes (see FIG. 1A). The clamps 54 of the support frames 5 are then fastened onto the corresponding narrow portions 311 of the lower frame 3.

The flat surfaces 611 of the upper frame 6 are then flushed with the flat surfaces 52 of the support frames 5, and screws 7 are passed through the screw holes 612 of the upper frame 6 into the screw holes 53 of the frame supports 5 to lock them firmly together (see FIG. 1B).

Figure 3:
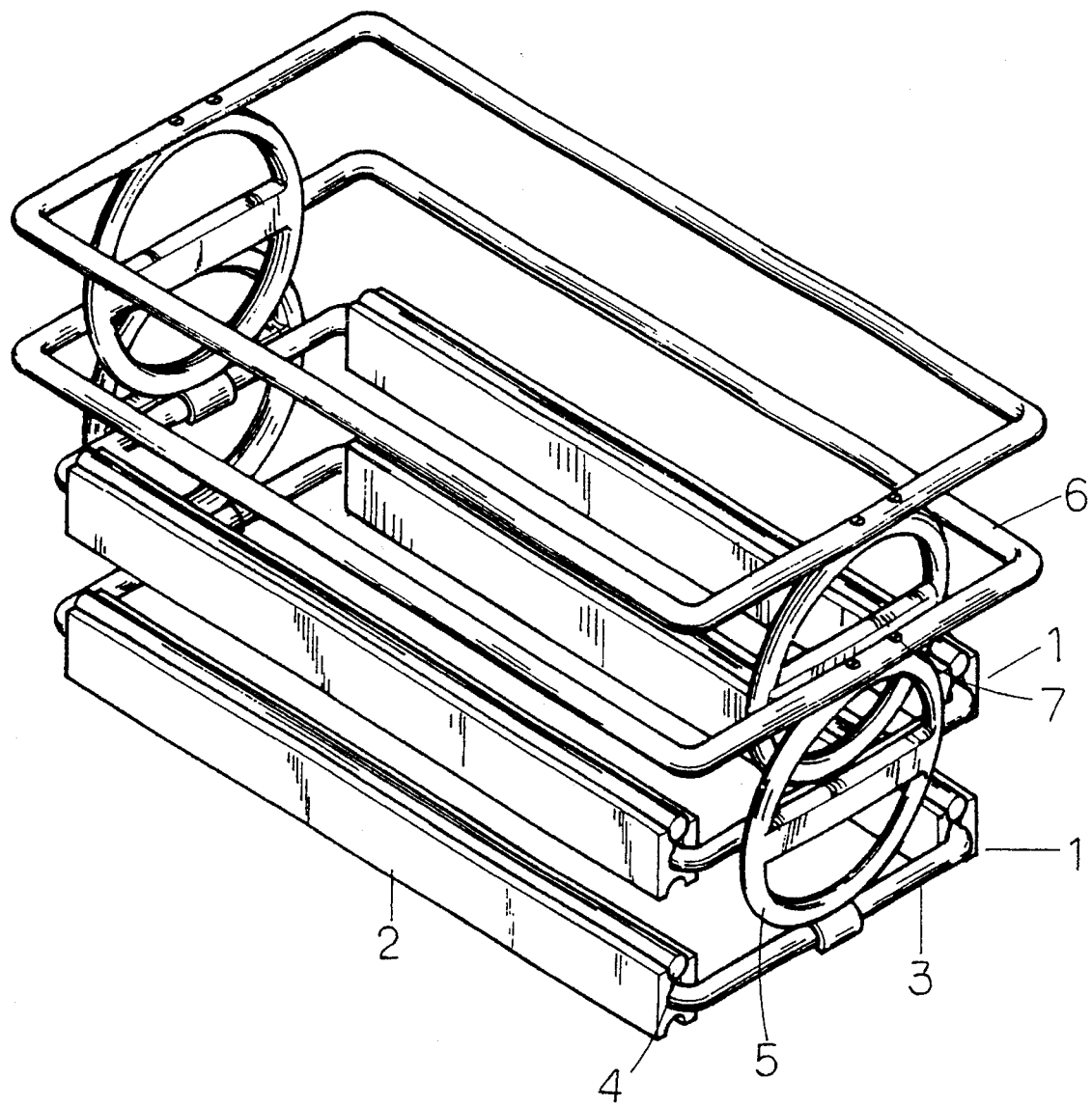
FIG. 3 is a schematic view showing a number of the compact disk assembly racks according to the present invention placed one on top of the other.
Figure 4:
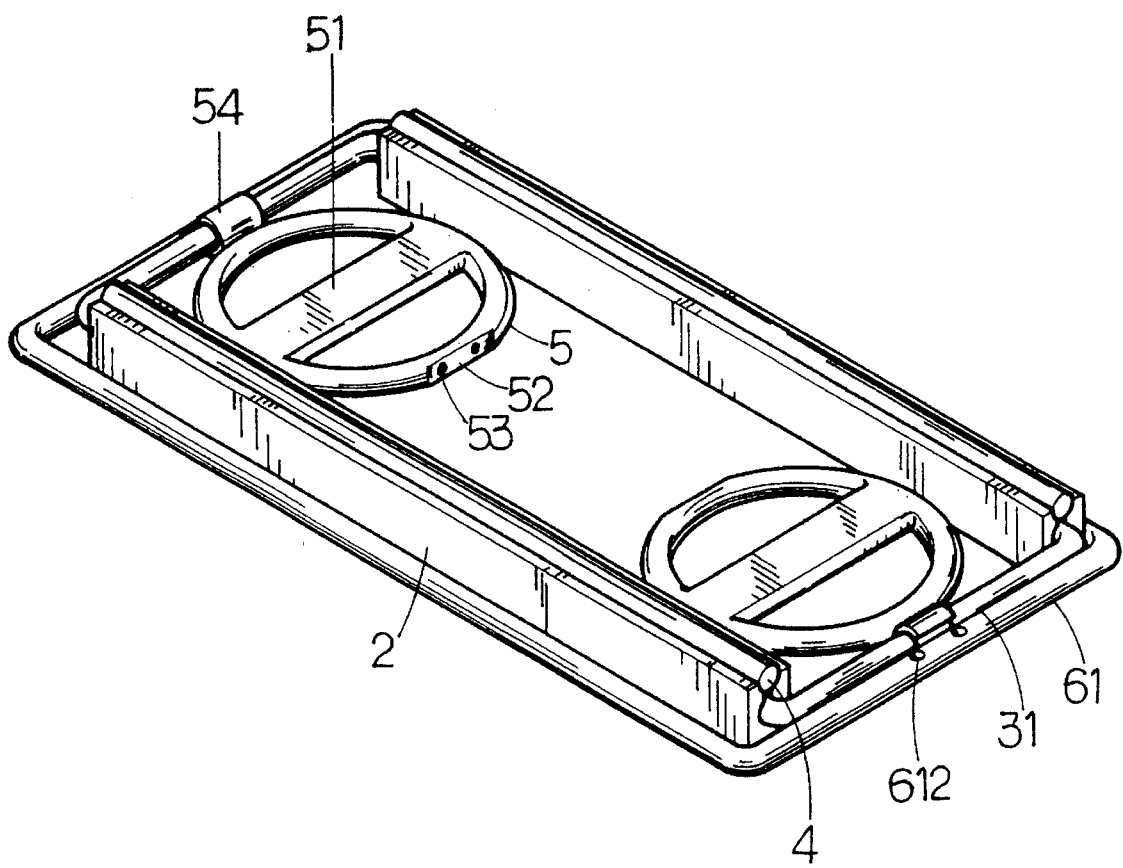
FIG. 4 is a schematic view showing the support frames of the present invention folded inwardly.

Referring to FIG. 3, since the lower frame 3 is smaller than the upper frame 6, a number of the compact disk assembly racks according to the present invention may be placed one on top of the other to save space in storage and transportation, hence reducing costs. In addition, the compact disk assembly rack according to the present invention may be partly assembled, leaving the step of fastening the upper frame 6 and the support frames 5 together by screws 7. In this way, the support frames 5 may be turned inwardly to rest within the hollow space of the lower frame 3. The upper frame may then be placed level around the outer periphery of the lower frame 3 which is smaller (as shown in FIG. 4), so as to effectively save space-and reduce storage and transportation costs.

Although the present invention has been illustrated and described with reference to the preferred embodiment thereof, it should be understood that it is in no way limited to the details of such embodiment but is capable of numerous modifications within the scope of the appended claims.

What is claimed is:

1. A compact disk assembly rack structure comprising:

two elongated strips having suitable elasticity, each of said strips having an upper groove and a lower groove of a suitable depth respectively formed in an upper side and a lower side thereof, said upper groove extending longitudinally downward to form a circular portion with a narrow gap formed therebetween;

a rectangular lower frame bent from a circular rod and having two narrow portions respectively formed at suitable positions of two shorter sides thereof; two circular rods formed of plastic material;

two support frames which are generally annular in shape, each of said support frames having a horizontal bar across a central hollow portion thereof, a top side of each of said support frame parallel to said horizontal bar being configured to be a flat surface having a plurality of screw holes therein, and a clamp being disposed at a bottom side of each of said support frame opposite to said level surface;

a rectangular upper frame bent from a circular rod and larger than said lower frame, two shorter sides of said upper frame each having a flat surface formed at a bottom side thereof, and a plurality of screw holes being formed in said shorter sides of said upper frame opposite to said flat surfaces of said upper frame, wherein each of the two longer sides of said lower frame is respectively fitted into said upper groove of each of said strips and squeezed past said gap into said circular portion below to be positioned therein; said two rods are respectively fitted into said upper grooves of said strips; said clamp of each of said support frames is fastened onto each of said narrow portions of said two shorter sides of said lower frame; said flat surfaces of said upper frame are flushed against said flat surfaces of said support frames and said upper frame and said support frames are fastened together by means of screws passing through said screw holes in said shorter sides of said upper frame and said screw holes in said flat surfaces of said support frames.

\* \* \* \* \*